Figure 1:
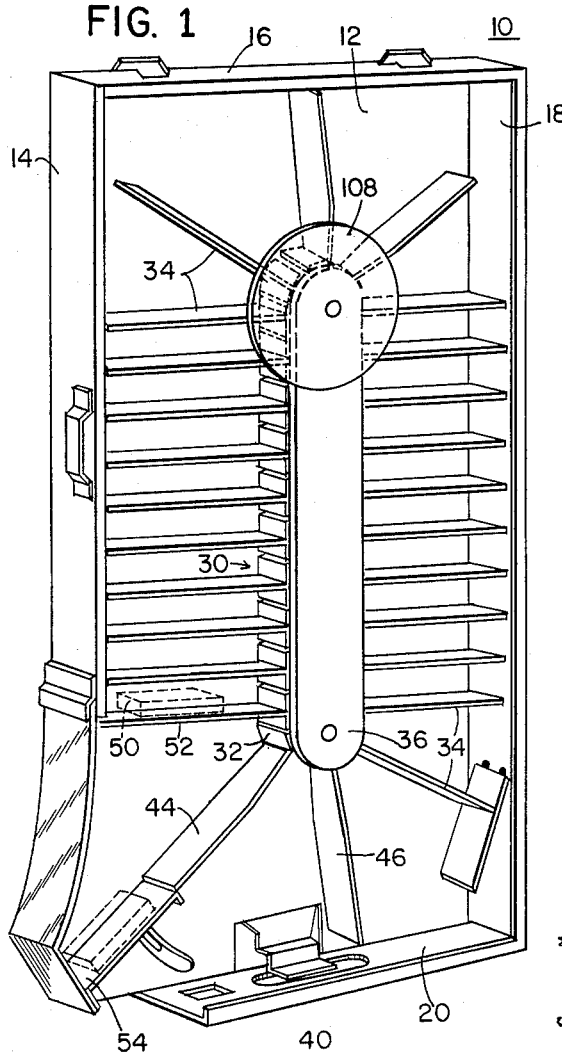

June 28, 1966 C. T. BREITENSTEIN ETAL 3,258,109
CONVEYOR BELT CONSTRUCTION FOR VENDING MACHINES
Filed Aug. 18, 1964 2 Sheets-Sheet 1

Inventors
Charles T. Breitenstein
Norbert A. Gecewicz
By
Marvin M Chaban
Atty

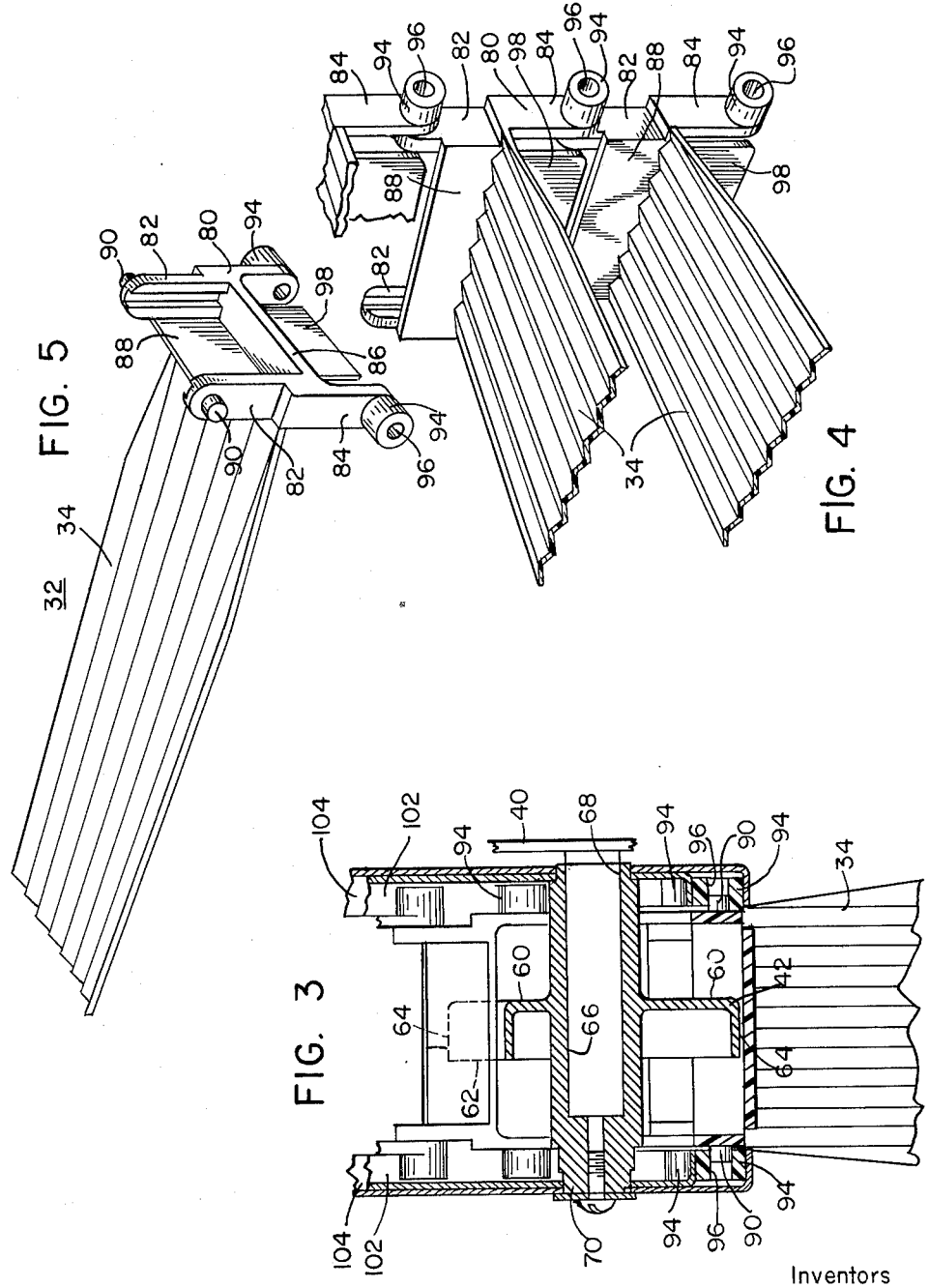

United States Patent Office 3,258,109
Patented June 28, 1966

3,258,109
CONVEYOR BELT CONSTRUCTION FOR VENDING MACHINES
Charles T. Brettenstein, Elk Grove Village, and Norbert A. Gecewicz, Franklin Park, Ill., assignors to Automatic Canteen Company of America, Chicago, Ill., a corporation of Delaware
Filed Aug. 18, 1964, Ser. No. 390,343
6 Claims. (Cl. 198—154)

The present invention relates to conveyor belt construction and more particularly to the construction of a shelf-bearing, endless belt conveyor adapted for use in such applications as vending machines and the like.

The invention has as its object to provide a new and improved conveyor belt construction which is readily assembled and which may be disassembled quickly for replacement of defective or damaged parts.

Another object of the invention is to provide a shelf-type vertical conveyor belt which is constructed of a plurality of identical members joined together by the inherent structure of the members.

It is a further object of the invention to provide a new and improved conveyor belt of the type which is designed to mount essentially vertically and has mounting shelves extending normally from the belt proper, wherein defective or broken shelves may be readily replaced in a most expedient manner.

It is still a further object of the invention to provide an improved conveyor belt construction which requires but one drive sprocket and wherein the belt may readily be constrained to its endless oval path by the combination of its structural members riding within generally oval stationary tracks.

To effect these and other objects, the present invention utilizes to form the conveyor belt, a plurality of identical, unitary shelf elements which may be molded of generally rigid, slightly yieldable or resilient synthetic resin, such as polypropylene. Each shelf element has a substantially H-shaped section, when viewed from one end, the joining bar of the H being extended normal to the H-section to comprise an article holding shelf.

In the H-section each upper arm has a co-axial dowel pin extending transversely outwardly from the arm; the lower legs of each H-section having co-axial tubular members extending outwardly, transversely therefrom. The tubular bore of these last-mentioned members are sized to receive in tight fitting, mating relation therein the dowel pins of the adjacent shelf element. As mentioned previously, the shelf elements are slightly yieldable, so that the H-legs may be temporarily deformed outwardly to receive the dowel pins of the next shelf element in the bores of its co-axial tubular members. By joining the required number of shelf elements into the endless configuration, an endless belt is formed with shelves extending normally from the belt at equally spaced intervals.

The belt structural elements are inherently substantially rigid, and are joined together in a manner allowing relative movement between joined elements in a limited amount. The resulting belt may be fitted in an oval form with the ends of the oval of comparatively small diameter. A sprocket is placed within the diameter of one end of the oval and engages the belt through a form of tongue and groove mating connection with a number of the belt elements. To effect this mating, each belt element has a drive extension rib parallel to the cross bar of the element (the shelf) and extending from the belt on the side opposite the shelf. Thus, the extension rib of each element extends inwardly of the belt to act as a tongue mating with one of a plurality of spaced grooves or notches in the rotatable driving sprocket wheel. Outwardly of the belt, the shelves extend to carry articles about the exterior of the belt path. The belt may be constrained to vertically elongated oval motion within a track, the track being of slightly greater width than the outer diameter of the tubular members. The track wall serves as a raceway within which the belt tubular members slide, the tubular members thereby acting as bearings for the belt as it rides in the track as driven by the single sprocket wheel.

Figure 2:
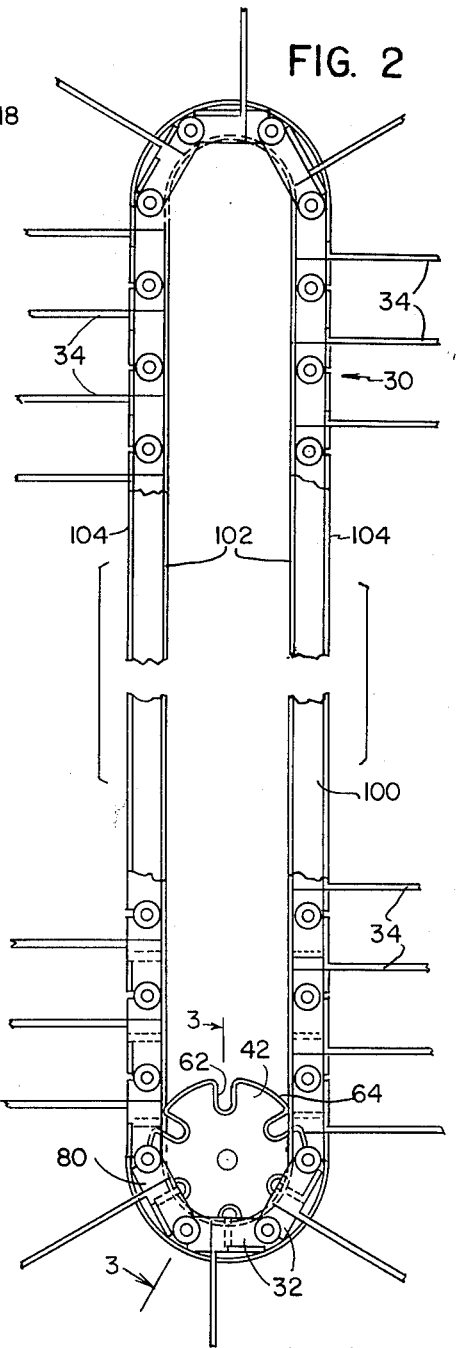

The invention both as to its organization and principle of operation, together with further objects and advantages thereof, will best be understood by reference to the following specification taken in connection with the accompanying drawings, in which:

FIGURE 1 is a perspective view of a vending column employing the novel conveyor belt construction;
FIGURE 2 is a side view in elevation of the conveyor belt of FIGURE 1;
FIGURE 3 is a sectional view taken along line 3—3 of FIGURE 2;
FIGURE 4 is a partial view in perspective of a portion of a conveyor belt of FIGURE 2; and
FIGURE 5 is a perspective view of one of the belt elements employed herein.

In FIGURE 1, there is shown a conveyor column structure or magazine 10 adapted to fit within a vending machine of the type shown in co-pending application 318,974 filed Oct. 25, 1963, now U.S. Patent 3,194,432, issued July 13, 1965, to the inventors of the present application. The column structure shown comprises a generally rectangular box with a large area side wall 12, and surrounding wall of comparatively short depth, comprising front, top, rear, and bottom walls 14, 16, 18, and 20, respectively.

The magazine 10 is open at the front and has a conveyor or belt 30 supported on the side wall 12. The conveyor 30 is a composite belt including a number of belt elements 32, each having a shelf 34 extending normally therefrom. An oval or elliptical cover plate 36 mounted on side wall 12 covers the belt mounting portion and prevents articles carried by the shelves from entering the interior of the belt oval. The belt is configured into a generally oval shape, as seen best in FIGURE 2, and the belt traverses an oval path parallel to side wall 12 with its shelves traversing a similar path parallel to side wall 12.

To move the belt about its path, suitable drive means, of the type shown in the cited co-pending vending machine application, actuate drive arm 40 to index the driving sprocket wheel 42 one notch, the spacing of which is equivalent to an angular distance sufficient to drop the downwardly angled shelf 44 to the position of shelf 46 and to move all other shelves 34 a like distance. Thus, any article 50 borne by the lowermost front shelf will be dropped onto display shelf 54 for dispensing, by means not shown herein, on the next belt movement step.

Sprocket wheel 42 (shown in section in FIGURE 3 and in end view in FIGURE 2) has a wheel section 60, generally circular in extent with U-shaped cutouts 62 notched equally into its periphery 64. This wheel has integrally affixed to it a tubular shaft 66. Shaft 66 mounts the wheel 42 rotatably on side wall 12, and the shaft in turn is rotated by the drive arm 40 adjacent its mounting to wall 12 at shaft mounting end 68. The opposite end 70 of shaft 66 serves as a bearing within outer plate 36. Shaft 66, as shown, is hollow to permit outer plate 36 to be mounted to wall 12 therethrough.

Now turning to the construction of the belt 30, there is shown in FIGURE 5, one belt element 32, which in a preferred form is molded of a synthetic resin such as polypropylene. The belt elements are joined together without the need for tools and require no components or members other than the plurality of elements 32. Each element includes a shelf 34 and normal thereto a mounting section 80 which is generally H-shaped. The mounting section 80 has two upper side supports 82, two lower side supports 84, and a cross bar or rib 86 extending between the left and right sides at the juncture of the upper side supports 82 and lower side supports 84. This rib is parallel to shelf 34 and extends from the mounting portion in a direction opposite to the shelf extent.

Spanning and joining the upper side supports 82, is an integral web 88 rising above the shelf 32 in the upper end of the mounting section 80. In this upper end, extending outwardly from side supports 82 are integral dowel pins 90 which are co-axially disposed with respect to one another and are of short extent.

The lower side supports 84 of H-section 80 extend downwardly from cross bar 86 parallel to upper supports 82. Adjacent their lower edge, supports 84 have integral, short, tubular rollers 94 extending outwardly of supports 84, co-axially disposed with respect to one another. The bores 96 of rollers 94 are large enough to accommodate dowel pins 90 in a mating relation, as shown in FIGURE 4.

A lower protective plate 98 extends downwardly from cross bar 86. The plate is spaced from the lower side supports 84, so that the lower supports 84 may be flexed outwardly to matingly receive the pins 90.

To join the individual elements 32 into the belt of FIGURE 2, no other members of any kind are required. No tools are needed to join the elements and the elements themselves contain the interconnecting portions utilized. The actual joining is accomplished by aligning one element 32 above another identical one, flexing the lower side supports 84 of the element B (FIGURE 4) outwardly to receive the dowel pins 90 of the lower element A on either lateral end in tubular bosses 94. Two elements are thus joined to start the assembly of a belt 30. A third element C is joined to element B through the mating of pins 90 of element B in the bores 96 of the tubular bosses 94 of element C. In a like manner, an endless belt may be formed by joining the number of elements required to reach the required belt length, as indicated in FIGURE 2.

The belt formed has a plurality of shelves 34, which, as shown, may be either flat (as seen in FIGURE 1) or corrugated in section, and which extend individually normally from the belt. The space between adjacent shelves at the belt mounting is substantially continuous, in that web 88 of a lower element extends to a level closely adjacent to the bottom edge of the protector plate 98, on one vertical side of the belt, on the opposed belt side the relative position of web 88 and plate 98 will, of course, be reversed. The substantially continuous belt wall resulting from the vertical, closely spaced disposition of web 88 of one belt element and the plate 98 of the adjacent belt element, maintains shelf-borne articles on the respective shelves and prevents such articles from falling into the inner oval (FIGURE 2) formed by the belt.

The joined elements forming the belt are fitted onto the single sprocket wheel 42 within the oval raceway 100 formed by inner and outer race walls 102 and 104, as indicated in FIGURE 2. Once fitted in place, the cross bars 86 of the three bottommost shelf elements mate respectively with the bottom cutouts or notches 62 of sprocket wheel 42 to guide and drive the belt about its vertically elongate path.

The raceway walls, both inner and outer, are oval in extent and confine the belt to motion in the oval path. The raceway walls provide the means for tracking the belt in its path without the necessity for a second or upper sprocket wheel. These raceway walls are spaced apart sufficiently to receive in sliding relation therein the tubular rollers which, due to their inherent lubricity, slide freely in the raceway. Thus, as the sprocket wheel is rotated in a step-by-step manner, the belt is indexed a like distance with its movement tracked by the raceway walls.

The raceway walls 102 and 104 may be individual sheet metal, walled structures mounted to rear wall 12 in superimposed relationship and like inner and outer walls may be formed as part of the interior of cover plate 36. A sheet metal disc 108 supported on cover plate 36 screens the top portion of the belt oval and prevents articles being carried by the belt falling out when the article reaches the top of the belt path. The article will fall onto the next shelf and be carried down to the dispensing area in discrete steps.

Thus, for each pulsed movement of drive arm 40 as explained in the cited co-pending application, sprocket wheel 42 is rotated ⅙ of a revolution. The movement of the wheel is transmitted to the belt cross bars by the previously described tongue and groove connection of ribs 86 in sprocket cutouts 62, and the belt is moved a linear distance in its drive path approximately equal to the angular distance of the sprocket wheel periphery. The path traversed by the belt is determined by the raceway configuration and the motion of the bosses 94 within the race walls 102 and 104. As a result, product articles borne by the shelves are successively advanced upwardly in the rear, and downwardly in the front toward the dispensing position when the position of shelf 50 (FIGURE 1) is reached.

With the construction shown, belts are assembled of like elements joined together by simple interconnections and the belts are individually tracked within tracking paths determined by the raceway configurations, the belt elements including integral bosses slidingly engaging the raceway walls and integral drive members mating with the drive wheel.

While there has been described what is at present thought to be the preferred embodiment of the invention, it will be understood that modifications may be made therein and it is intended to cover in the appended claims all such modifications as fall within the true spirit and scope of the invention.

What is claimed is:

1. A conveyor belt structure comprising a plurality of identical structural elements joined together in endless fashion,
    (A) each of said elements substantially H-shaped comprising unitary shelf and mounting portions,
        (1) said shelf portion extending normally in one direction from said mounting portion at the cross bar of said H,
        (2) said mounting portion comprising uprights at either side of said mounting portion crossbar,
            (a) female members extending outwardly from said uprights at one longitudinal end, and
            (b) male members extending outwardly from said uprights at the remote longitudinal end thereof,
            (c) said male members adapted to join with female members of an element next adjacent to said one end,
            (d) said female members adapted to join with the male member of an element next adjacent to the remote end thereof whereby to join said elements to form an endless loop, and
        (3) a driving member on each of said elements extending normally from the H-shape intermediate its longitudinal ends in the direction opposite the shelf direction for driving the belt in the plane of said mounting portions.

2. A conveyor belt structure comprising a plurality of generally rigid, identical structural elements joined together in endless fashion, (A) each of said elements comprising integral shelf and mounting portions,
   (1) said shelf portion extending normally from said mounting portion,
   (2) said mounting portion comprising supports at either longitudinal and lateral side of said mounting portion,
      (a) integral female members extending outwardly from said mounting portion at one longitudinal end, and
      (b) integral male members extending outwardly from said mounting portion at the remote longitudinal end thereof,
      (c) said male members of an element adapted to mate with female members of an element adjacent to said one longitudinal end,
      (d) said female members adapted to mate with the male members of an element adjato the opposite longitudinal end whereby to join said elements to form said endless belt structure,
   (3) a drive member on each of said elements,
(B) means engaging one of said drive members for moving said belt,
(C) stationary raceway structure for constraining said belt to motion in an elliptical path and into engagement with said moving means, and
   (1) said female members extending laterally from each element into said raceway structure to track said endless belt structure within said raceway.

3. A conveyor belt structure comprising a plurality of generally rigid, identical structural elements joined together in endless fashion,
(A) each of said elements comprising integral shelf and mounting portions with the mounting portions being substantially H-shaped,
   (1) said shelf portion extending normally from said mounting portion at the cross bar of said H,
   (2) said mounting portion comprising uprights at either side of said mounting portion,
      (a) co-axial tubular slide members extending outwardly from both said uprights at one longitudinal end, and
      (b) co-axial dowel pins extending outwardly from both uprights at the remote longitudinal end thereof,
      (c) said dowel pins adapted to mate in the tubular members of the element adjacent to said one end,
      (d) said tubular members adapted to receive the dowel pins of an element adjacent to the remote end thereof whereby to join said elements to form said endless belt structure,
   (3) a drive member on each of said elements extending from said mounting portions opposite the shelf portion of the element H,
(B) means engaging one of said drive members for moving said belt, and
(C) stationary raceway structure confining the tubular members of said elements for constraining said belt to slide motion in an elliptical path and for holding said belt structure in engagement with said moving means.

4. A conveyor belt structure adapted for use in a vending machine which has a magazine, said structure including:

(A) stationary raceway structure, and
(B) a joined, endless belt driveable by a sprocket wheel through the path of said raceway structure,
   (1) said belt consisting of a plurality of joinable identical elements,
      (a) members on each of said elements for joining one element to the adjacent elements, for engaging elements with the sprocket wheel as the belt passes the sprocket and for journalling the belt within said raceway for the extent of the raceway.

5. A conveying mechanism for use in a vending machine which has a magazine including:
(A) stationary raceway structure, and
(B) a joined, shelved belt driveable by a sprocket wheel through the path of said raceway,
   (1) said belt comprising a plurality of identical elements joinable in endless belt fashion, each of said elements including:
      (a) members integral to the element forming a shelf extending normal to the plane of the belt,
      (b) members integral to the element joining one element to the elements on either longitudinal side thereof,
      (c) members integral to the element for coupling elements to the sprocket wheel as the belt passes to sprocket wheel, and
      (d) members integral to the element for journalling said belt in said raceway and configure said belt in a shape similar to that of the path of the raceway.

6. A conveying structure for use in a vending machine of the type which has a magazine including:
(A) spaced opposed oblong track walls defining the sides of a travel path, and
(B) a shelved belt driveable by a sprocket wheel through said travel path, said belt including a plurality of identical elements joinable in endless fashion, each of said elements including:
   (1) an integral shelf extending normally from the belt for carrying articles to be vended about the exterior of said travel path,
   (2) male and female members integral to each element for mating with like members on adjacent elements to form the endless belt,
   (3) an integral rib on each element intruding into said travel path for drivingly coupling elements to the sprocket as the belt passes the sprocket wheel, and
   (4) tubular members integral to each element and sized to slideably engage the opposed track walls to track and journal said belt in said oblong path and configure said belt in a shape similar to that of the travel path.

References Cited by the Examiner
UNITED STATES PATENTS

| 410,527 | 9/1889 | Knapp | 198—154 |
| 436,608 | 9/1890 | Miller | 198—189 |
| 670,285 | 3/1901 | Levalley | 198—189 |
| 1,925,563 | 9/1933 | Morin | 221—84 |
| 3,164,294 | 1/1965 | Phillips | 221—84 |

EVON C. BLUNK, *Primary Examiner.*

RICHARD E. AEGERTER, *Examiner.*